US012644461B2

(12) United States Patent
Ruiz et al.

(10) Patent No.: US 12,644,461 B2
(45) Date of Patent: Jun. 2, 2026

(54) FAN ASSEMBLY

(71) Applicant: Dyson Technology Limited, Malmesbury (GB)

(72) Inventors: Lucy Ruiz, Bristol (GB); Timothy Neil Jukes, Swindon (GB); Matthew Mundy, Swindon (GB); Robert James Kyle, Bristol (GB); Matthew Jerome Jennings, Cheltenham (GB); Peter David Gammack, Gloucester (GB)

(73) Assignee: DYSON TECHNOLOGY LIMITED, Malmesbury (GB)

(*) Notice: Subject to any disclaimer, the term of this patent is extended or adjusted under 35 U.S.C. 154(b) by 0 days.

(21) Appl. No.: 18/851,763

(22) PCT Filed: Mar. 21, 2023

(86) PCT No.: PCT/GB2023/050703
§ 371 (c)(1),
(2) Date: Sep. 27, 2024

(87) PCT Pub. No.: WO2023/187325
PCT Pub. Date: Oct. 5, 2023

(65) Prior Publication Data

US 2025/0215881 A1 Jul. 3, 2025

(30) Foreign Application Priority Data

Mar. 28, 2022 (GB) ..................................... 2204345

(51) Int. Cl.
*F04D 25/08* (2006.01)
*F04D 27/00* (2006.01)
*F04D 29/42* (2006.01)

(52) U.S. Cl.
CPC ........... *F04D 25/08* (2013.01); *F04D 27/002* (2013.01); *F04D 29/4246* (2013.01); *F05D 2250/12* (2013.01); *F05D 2250/141* (2013.01)

(58) Field of Classification Search
None
See application file for complete search history.

(56) References Cited

U.S. PATENT DOCUMENTS 2,488,467 A 11/1949 De Lisio
7,118,323 B2 * 10/2006 Lyer ........................ F04D 17/04 416/100

(Continued)

FOREIGN PATENT DOCUMENTS

CN 204787116 U 11/2015
GB 2568979 A 6/2019

(Continued)

OTHER PUBLICATIONS

Zhuang et al—CN 204787116 U + machine translation (Year: 2015).*
Tai et al—JP 2020045830 A—description machine translation (Year: 2020).*

*Primary Examiner* — Juan G Flores
(74) *Attorney, Agent, or Firm* — Tucker Ellis LLP; Michael G. Craig

(57) ABSTRACT

A fan assembly, comprising an airflow generator arranged to generate an airflow and a nozzle comprising a nozzle body and first and second air outlets defined in a front side of the nozzle body, the first and second air outlets arranged to emit the airflow from the fan assembly in a substantially forward direction of the nozzle body. The fan assembly comprises a valve mechanism to selectively permit the airflow to pass through the first air outlet or the second air outlet, wherein the first and second air outlets have different geometries such that the first air outlet emits a first airflow delivered to a user (Continued)

as a focused airflow, and the second air outlet emits a second airflow delivered to a user as a diffused airflow.

16 Claims, 6 Drawing Sheets

(56) References Cited

U.S. PATENT DOCUMENTS

| | | | | |
|---|---|---|---|---|
| 8,366,403 | B2 * | 2/2013 | Wallace | F04F 5/16 417/198 |
| 2006/0093463 | A1 * | 5/2006 | Lyer | F04D 17/04 415/53.1 |
| 2012/0034108 | A1 * | 2/2012 | Wallace | F24H 9/0063 417/313 |
| 2019/0003727 | A1 | 1/2019 | Kim et al. | |
| 2019/0024909 | A1 | 1/2019 | Lee et al. | |
| 2021/0341169 | A1 | 11/2021 | Oh et al. | |

FOREIGN PATENT DOCUMENTS

| | | | | |
|---|---|---|---|---|
| JP | 2002195642 | A | | 7/2002 |
| JP | 2020045830 | A | * | 3/2020 |
| WO | 2019066189 | A1 | | 4/2019 |
| WO | 2021141315 | A1 | | 7/2021 |
| WO | 2021235619 | A1 | | 11/2021 |

* cited by examiner

Section Z-Z

FAN ASSEMBLY

RELATED APPLICATION DATA

This application is a national phase application of International Application No. PCT/GB2023/050703 filed Mar. 21, 2023, which claims priority to GB Application No. 2204345.9 filed Mar. 28, 2022.

FIELD OF THE INVENTION

The present invention relates to a fan assembly and a nozzle for a fan assembly.

BACKGROUND OF THE INVENTION

Conventional domestic fans that are used for the purposes of thermal comfort and/or environmental or climate control generate an airflow to provide a cooling sensation. The movement and circulation of the air flow creates a 'wind chill' or breeze and, as a result, the user experiences a cooling effect as heat is dissipated through convection and evaporation. Other air treatment devices used for the purposes of user comfort also generate an airflow to provide treated airflow.

In some instances, a user may wish to experience a greater or lesser air treatment sensation in their vicinity, such as a level of heating, cooling, humidification and/or purification. Typically, this is achieved by increasing or decreasing a flow rate of the air treatment device. Whilst the sensation experienced by the user is altered by doing so, environmental or climate control may be detrimentally affected.

SUMMARY OF THE INVENTION

According to a first aspect of the present invention there is provided a fan assembly comprising an airflow generator arranged to generate an airflow, a nozzle comprising a nozzle body and first and second air outlets defined in a front side of the nozzle body, the first and second air outlets arranged to emit the airflow from the fan assembly in a substantially forward direction of the nozzle body, and a valve mechanism to selectively permit the airflow to pass through the first air outlet or the second air outlet, wherein the first and second air outlets have different geometries such that the first air outlet emits a first airflow delivered to a user as a focused airflow and the second air outlet emits a second airflow delivered to a user as a diffused airflow.

The second airflow emitted from the second air outlet may be divergent as it travels away from the second air outlet, whereas the first airflow emitted from the first air outlet may not be divergent or may be divergent to a lesser extent than the second airflow emitted from the second air outlet.

The fan assembly according to the first aspect of the present invention may be advantageous as the inventors of the present application have determined that emitting the first airflow from the first air outlet provides a substantially different user experience compared to emitting the second airflow from the second air outlet, for similar operating parameters at the airflow generator. That is, for similar flow rate and temperature of airflow exiting the nozzle, markedly different user experiences are provided depending on which outlet(s) the airflow is emitted from.

The fan assembly according to the first aspect of the present invention may be advantageous as the inventors of the present application have determined that providing the first and second air outlets and the valve mechanism provides a more versatile fan assembly, for example the fan assembly according to the first aspect of the present invention may increase user control and allow the fan assembly to satisfy a greater number of use cases.

The fan assembly according to the first aspect of the present invention may be advantageous as the inventors of the present application have determined that defining the first and second air outlets in a front side of the nozzle body provides a rapid relief effect when a focused airflow is delivered to a user from the first air outlet, and a comfortable long exposure effect when a diffused airflow is delivered to a user from the second air outlet.

The first air outlet may have an aspect ratio of substantially 1:1. That is, a height of the first air outlet may be substantially equal to a width of the first air outlet. For example, the first air outlet may be substantially circular or square, as viewed from the front side of the nozzle body. This may help to provide a more focused airflow to a user when the first airflow is emitted from the first air outlet.

The first air outlet may have an equivalent diameter between 20 mm and 200 mm. This may provide a desired target temperature and flow rate to the user.

The second air outlet may have an aspect ratio of between at least 2:1, and at least 100:1. That is, a height of the second air outlet may be between at least two times and one hundred times greater than a width of the second air outlet. For example, the second air outlet may be substantially rectangular, as viewed from the front side of the nozzle body. This may help to provide a more diffused airflow to a user when the second airflow is emitted from the second air outlet.

The second air outlet may be arranged such that airflow exiting the second air outlet entrains more ambient air than the airflow exiting the first air outlet. This may provide a more diffused airflow to a user from the second air outlet compared to airflow provided to a user from the first air outlet.

A height of the second air outlet may be at least two times greater than a height of the first air outlet. This may help to provide a more pronounced difference between the airflow emitted from the first and second air outlets for the same airflow generated by the airflow generator.

A width of the first air outlet may be at least two times greater than a width of the second air outlet. This may help to provide a more pronounced difference between the airflow emitted from the first and second air outlets for the same airflow generated by the airflow generator.

A ratio of cross-sectional areas of the first and second air outlets may be between 0.1 and 10. This may generate a difference in exit velocity of airflow at the first and second air outlets, which may provide a more pronounced difference between the airflow emitted from the first and second air outlets for the same airflow generated by the airflow generator.

The nozzle body may comprise an elliptical portion, the second air outlet may be defined in the elliptical portion and extend around at least a portion of the elliptical portion. This may provide a more diffused airflow to a user from the second air outlet.

The first air outlet may be substantially surrounded by the elliptical portion. For example, the elliptical portion may comprise a central bore extending through the nozzle body, and the first air outlet may be positioned in the central bore. This may help to ensure that airflow emitted from the first air outlet is centralised with respect to the nozzle body, which may help a user to determine a position of the first airflow emitted from the first air outlet.

The second air outlet may comprise two or more apertures. For example, the apertures may be positioned on opposite arms of the elliptical portion of the nozzle body. This may provide a more diffused airflow to a user from the second air outlet.

The first air outlet may be positioned between at least two apertures of the second air outlet. This may help to ensure that airflow emitted from the first air outlet is centralised with respect to the nozzle body, which may help a user to determine a position of the first airflow emitted from the first air outlet.

The first air outlet may be movable relative to the second air outlet. This may allow a user to selectively direct the first airflow emitted from the first air outlet to provide a targeted rapid relief effect to a desired location. For example, the first air outlet may be vertically movable within the central bore of the elliptical portion. For example, the first air outlet may be rotatable relative to the second air outlet to provide the first airflow in a direction that is not a substantially forward direction of the nozzle body, such as up to 30 degrees above or below horizontal.

The fan assembly may comprise a third air outlet defined in a different side of the nozzle body to the front side of the nozzle body. The third air outlet may be arranged to emit airflow from the fan assembly in a substantially sideward or rearward direction of the nozzle body. This may allow the fan assembly to operate in a low disturbance mode whereby, for example, airflow is not directed towards a user of the fan assembly.

The first, second and third air outlets may comprise one or more movable baffles for directing the airflow emitted from the respective air outlet. For example, the second air outlet may comprise a plurality of movable baffles for altering a vertical angle at which airflow emitted from the second air outlet is directed. This may provide more versatility to the fan assembly, allowing a user to further tailor their user experience.

The valve mechanism may be movable between first, second, third and fourth positions in order to change the airflow that is emitted from the nozzle body. This may enable a user to select an operating mode of the fan assembly.

In a first position of the valve mechanism, airflow generated by the airflow generator is permitted to pass through the first air outlet and is prevented from passing through the second or third air outlets such that a focused airflow is delivered to a user, for example to provide rapid relief to a user.

In a second position of the valve mechanism, airflow generated by the airflow generator is permitted to pass through the first air outlet and the second air outlet such that a focused and a diffused airflow is delivered to a user, for example to provide a combined airflow.

In a third position of the valve mechanism, airflow generated by the airflow generator is permitted to pass through the second air outlet and is prevented from passing through the first or third air outlets such that a diffused airflow is delivered to a user, for example to provide comfortable long exposure to a user.

In a fourth position of the valve mechanism, airflow generated by the airflow generator is permitted to pass through the third air outlet and is prevented from passing through the first and second air outlets such that an airflow is emitted in a direction other than a forward direction of the nozzle body, for example to provide a low disturbance mode.

The fan assembly may comprise an air treatment unit to selectively treat airflow generated by the airflow generator, and a controller to cause the valve mechanism to selectively permit or prevent airflow to pass through the first, second or third air outlet in dependence on a status of the air treatment unit. For example, the air treatment unit may comprise a heater and the controller may be configured to move the valve mechanism to the first position if the heater is operating in a heating mode. The air treatment unit may comprise one or more of a heater, a cooler, a humidifier, a dehumidifier and a purifier. This may increase the versatility of the fan assembly, allowing a user to further tailor their user experience.

The fan assembly may comprise a user interface operable by a user to cause the valve mechanism to selectively permit or prevent airflow to pass through the first, second or third air outlet and/or to cause the air treatment unit to operate in a particular mode. This may allow a user to specify more exact parameters relating to a desired airflow. The user interface may comprise one of: a button, a switch, a toggle, a knob, and a touch screen.

According to a second aspect of the present invention there is provided a nozzle for a fan assembly comprising a nozzle body having an inlet for receiving an airflow, first and second air outlets defined in a front side of the nozzle body and arranged to emit the airflow in a substantially forward direction of the nozzle body, and a valve mechanism to selectively permit the airflow to pass through the first air outlet or the second air outlet, wherein the first and second air outlets have different geometries such that the first air outlet emits a first airflow delivered to a user as a focused airflow and the second air outlet emits a second airflow delivered to a user as a diffused airflow.

The nozzle may be connected to a base of a fan assembly, the fan assembly comprising an airflow generator arranged to generate an airflow and a channel for directing the airflow to the inlet of the nozzle body.

The nozzle may be movably connected to the base of the fan assembly. This may allow the nozzle to direct air in a plurality of directions without the need to move all of the fan assembly.

Optional features of aspects of the present invention may be equally applied to other aspects of the present invention, where appropriate.

DETAILED DESCRIPTION OF THE INVENTION

Figure 1:
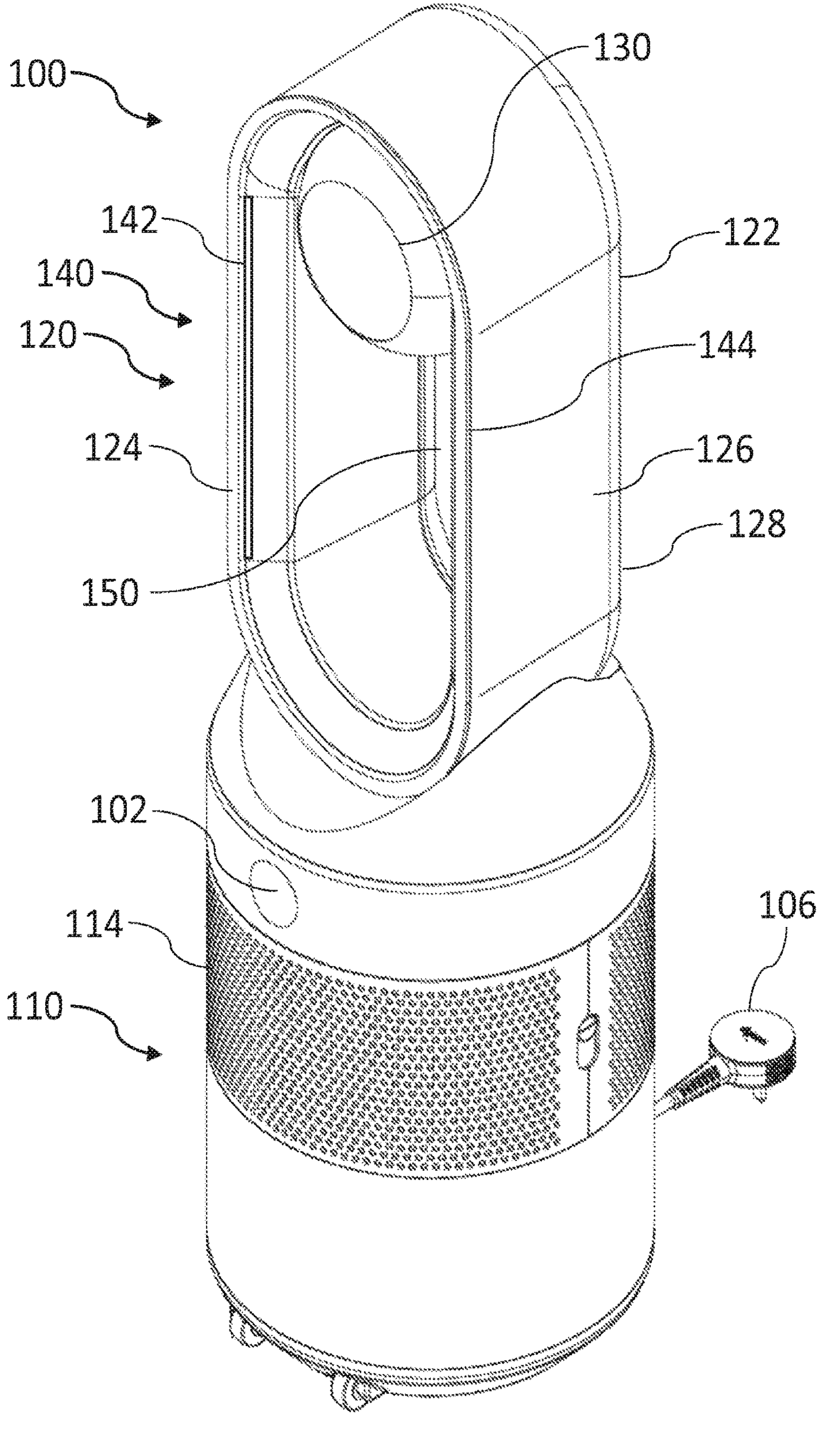
FIG. 1 is an isometric view illustrating a fan assembly according to the present invention.
Figure 2:
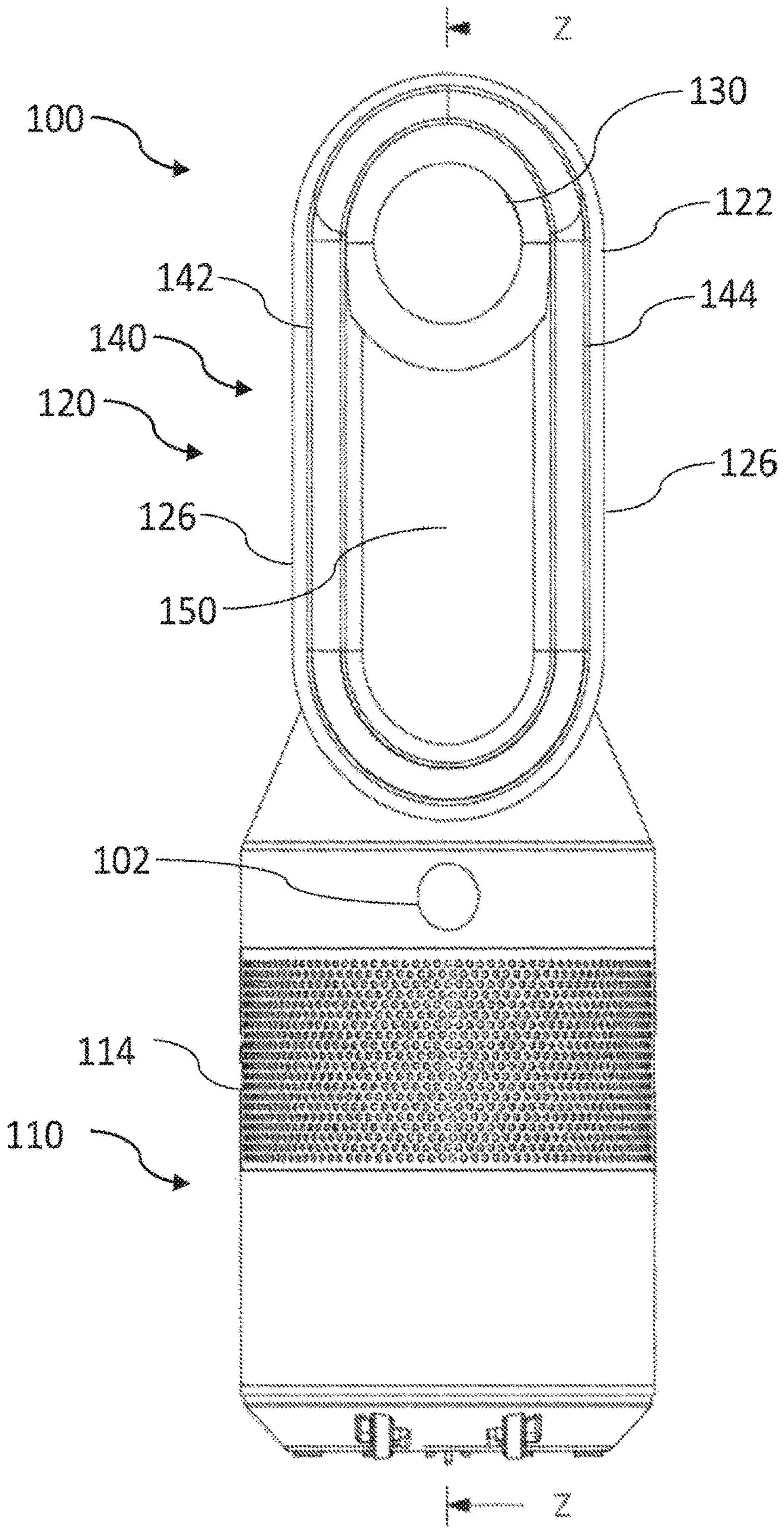
FIG. 2 is a front view of the fan assembly of FIG. 1.
Figure 3:
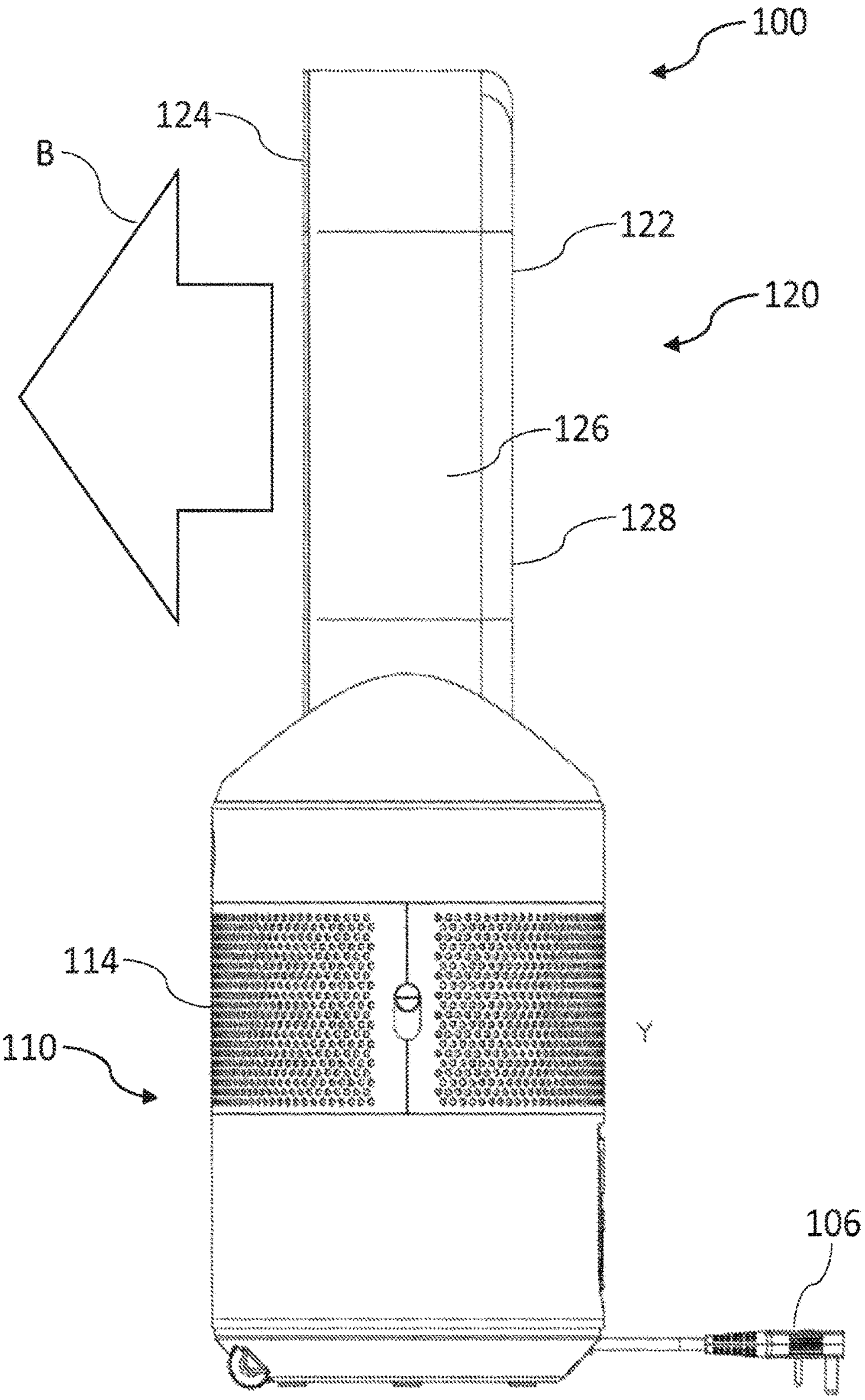
FIG. 3 is a side view of the fan assembly of FIG. 1.
Figure 4:
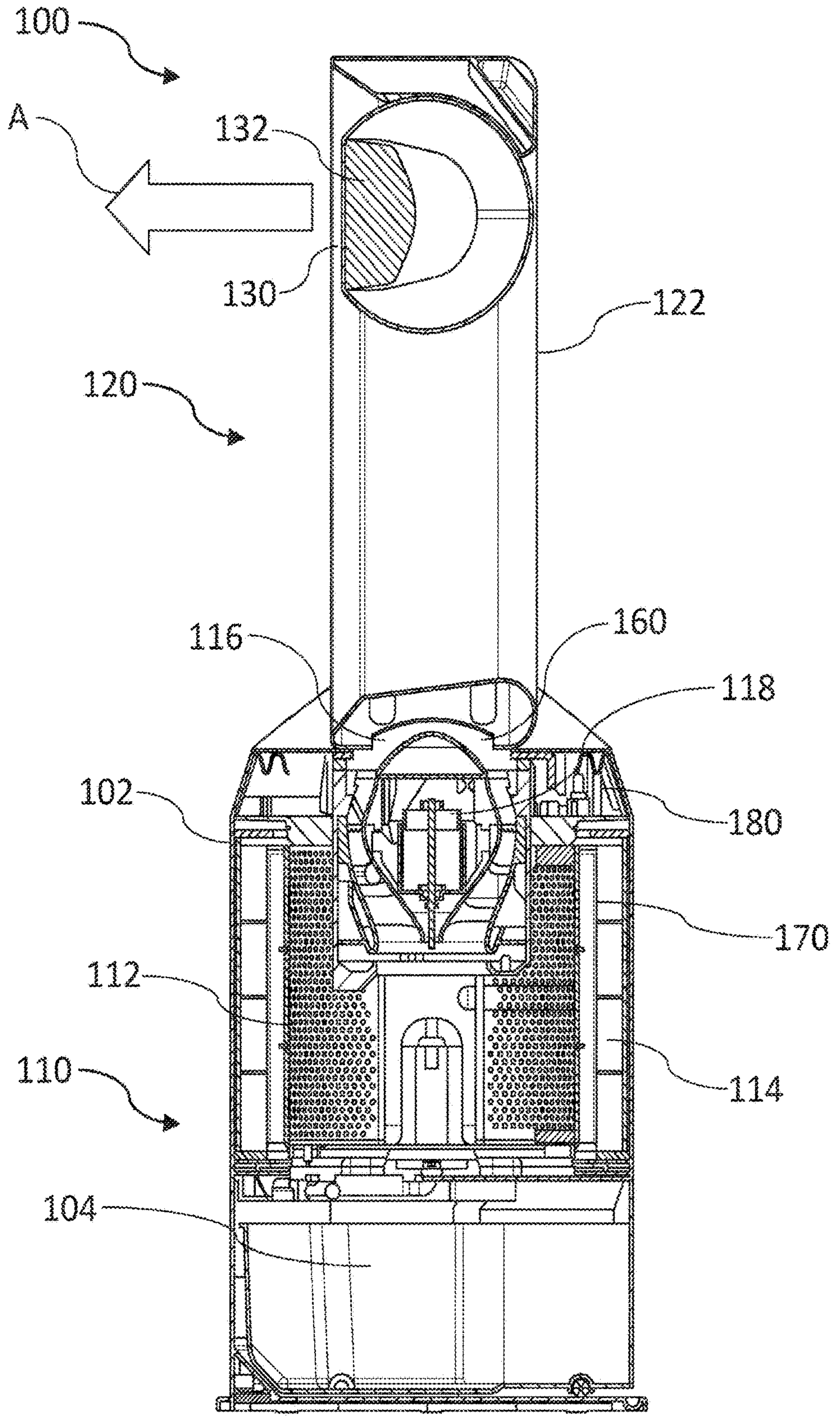
FIG. 4 is a cross-sectional side view of the fan assembly of FIG. 1.

There will now be described a fan assembly that can deliver to a user either a focused or a diffused airflow or simultaneously deliver to a user both a focused and a diffused airflow, and in doing so provide the user of the fan assembly with a plurality of options as to how air is delivered by the fan assembly. The term “fan assembly” as used herein refers to a fan assembly configured to generate and deliver an airflow for the purposes of thermal comfort and/or environmental or climate control. Such a fan assembly may be capable of generating a treated airflow, for example one or more of a dehumidified airflow, a humidified airflow, a purified airflow, a filtered airflow, a cooled airflow, and a heated airflow.

FIGS. 1 to 4 show various views of a fan assembly 100. The fan assembly 100 comprises a body or stand 110 comprising an air inlet 112 through which airflow enters the stand 110, at least one filter assembly 114 mounted on the stand 110 over the air inlet 112, an air outlet 116 through which airflow exits the stand 110 and a nozzle 120 mounted on the stand 110 and arranged to receive the airflow exiting the air outlet 116. The fan assembly 100 also comprises an airflow generator 118 arranged to generate an airflow, the airflow being drawn through the stand 110 and into the nozzle 120 in use. The fan assembly 100 is powered by mains power via a mains power cable 106. It will be appreciated that in other examples, the fan assembly may be powered by any other suitable means, for example batteries.

The nozzle 120 comprises a nozzle body 122 in the form of an elliptical portion of the nozzle 120, and having a front side 124, lateral sides 126 and a rear side 128.

The nozzle 120 comprises a first air outlet 130 arranged to emit a first airflow from the nozzle 120 that is delivered to a user as a focused airflow. The first air outlet 130 is defined in the front side 124 of the nozzle body 122 and is arranged to emit the first airflow in a substantially forward direction of the nozzle body, for example as denoted by the arrow A shown in FIG. 4. The focused airflow provides a rapid relief effect.

The first air outlet 130 is circular, having an aspect ratio of 1:1 and a diameter of approximately 100 mm. Accordingly, the first air outlet 130 emits a substantially circular airflow.

The first air outlet 130 is partially surrounded by the elliptical nozzle body 122 and, in this example, is positioned within a central bore 150 of the elliptical portion. Although shown at the top of the bore 150 in the Figures, it will be appreciated that the first air outlet 130 may be positioned elsewhere within the bore 150, for example at the centre or bottom of the bore 150. In other examples, at least part of the first air outlet may form part of the elliptical nozzle body 122.

In some examples, the first air outlet 130 is movable relative to the nozzle body 122, such as in a vertical direction between the top and bottom of the bore 150, thus allowing a user to tailor their user experience more accurately. In some examples, the first air outlet 130 is rotatable relative to the nozzle body 122, such as about a horizontal axis to allow the first airflow emitted from the first air outlet 130 to be directed in a more upward or downward direction compared to a horizontal direction.

The nozzle 120 comprises a second air outlet 140 having a different geometry to the first air outlet 130 and arranged to emit a second airflow delivered to a user as a diffused airflow from the nozzle 120. The second air outlet 140 is defined in the front side 124 of the nozzle body 122 and is arranged to emit the second airflow in a substantially forward direction of the nozzle body, for example as denoted by the arrow B shown in FIG. 3. The diffused airflow provides a comfortable long exposure effect.

The second air outlet 140 comprises two apertures 142, 144 defined in opposite arms of the elliptical nozzle body 122. The apertures 142, 144 are each rectangular, having an aspect ratio of approximately 10:1. It will be appreciated that in other examples, the apertures may have a different aspect ratio. The first air outlet 130 is located between the apertures 142, 144.

In use, airflow emitted from the second air outlet 140 may entrain surrounding ambient air, particularly ambient air from the central bore 150.

A height of the two apertures 142, 144 is approximately two times greater than a height of the first air outlet 130. A width of the first air outlet 130 is approximately 5 times greater than a width of each of the two apertures 142, 144. It will be apparent that in other examples, the width of the first air outlet may be approximately 2 to 10 times greater than a width of each of the two apertures.

The first and second air outlets 130, 140 comprise movable baffles 132 for directing the airflow emitted from the respective air outlet 130, 140. The movable baffles are manually movable by a user, but it will be apparent that examples are envisaged in which at least some of the movable baffles are movable by one or more motors, for example in response to an input by a user.

The fan assembly 100 comprises a valve mechanism 160 to selectively permit airflow to pass through the first or the second air outlet 130, 140. The valve mechanism 160 is movable between a first position, in which airflow generated by the airflow generator 118 is permitted to pass through the first air outlet 130 and is prevented from passing through the second air outlet 140, a second position in which airflow generated by the airflow generator 118 is permitted to pass through the first air outlet 130 and the second air outlet 140, and a third position in which airflow generated by the airflow generator 118 is permitted to pass through the second air outlet 140 and is prevented from passing through the first air outlet 130. In this example, the valve mechanism 160 is located adjacent to the air outlet 116 immediately downstream of the airflow generator 118. However, it will be appreciated that in other examples, the valve mechanism may be located elsewhere, for example at or immediately upstream of the first and/or second air outlets 130, 140.

Figure 5A:
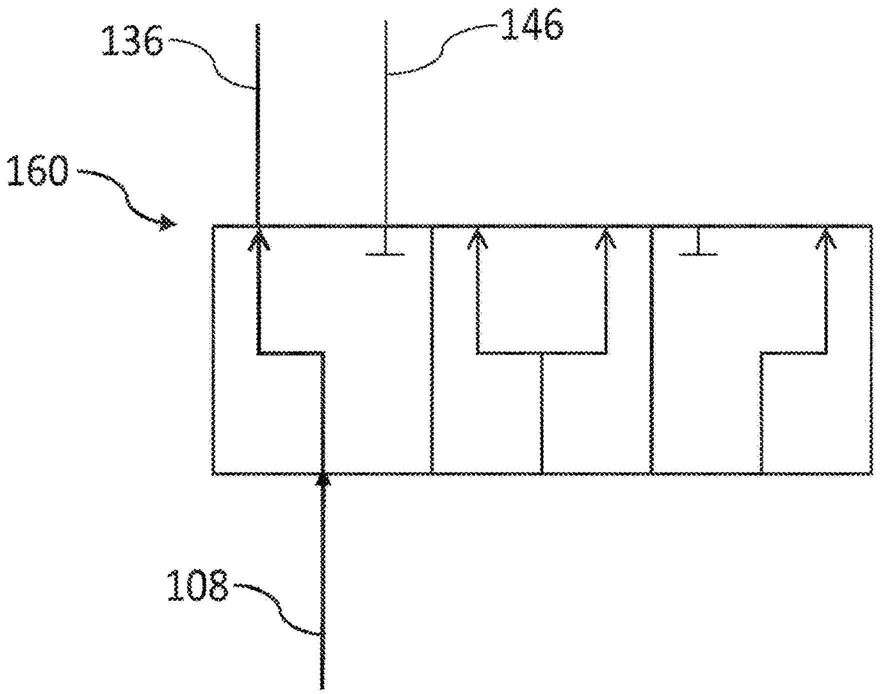
FIGS. 5*a* and 5*b* are schematic views of a valve mechanism of the fan assembly of FIG. 1.
Figure 5B:
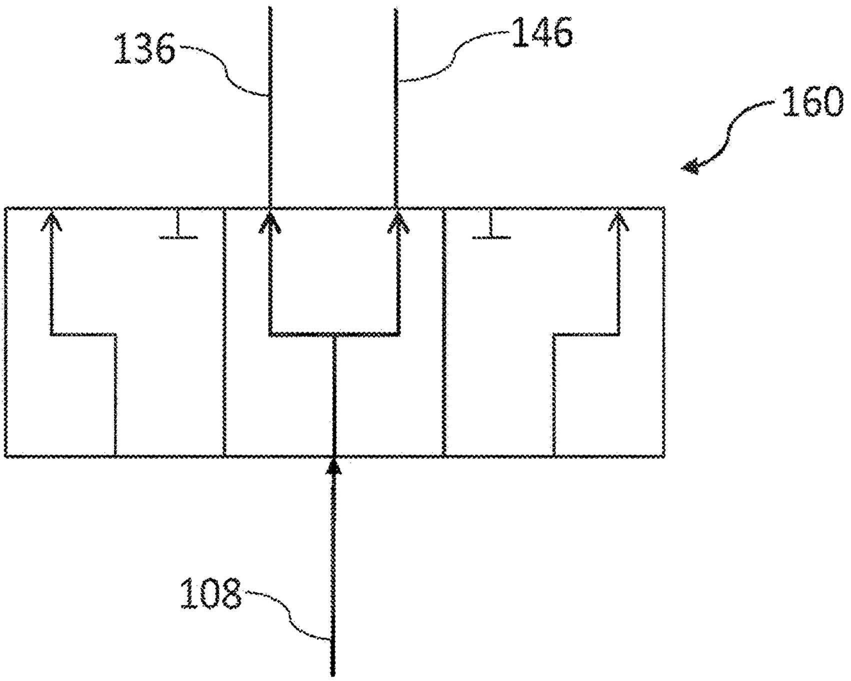

FIGS. 5*a* and 5*b* are schematic views of a valve mechanism 160 according to an example. In FIG. 5*a*, the valve mechanism 160 is in the first position and FIG. 5*b* is a schematic view of the valve mechanism 160 in the second position. An inlet line 108 receives airflow generated by the airflow generator 118 and emits airflow to the valve mechanism 160. A first outlet line 130 connects the inlet line 108 to the first air outlet 130 and a second outlet line 130 connects the inlet line 108 to the second air outlet 140. The valve mechanism 160 comprises a spool valve movable between the first, second and third positions, corresponding to the boxes 161, 162, 163 respectively. The spool valve is movable between positions by actuators (not shown). It will be appreciated that in other examples, any other suitable type of valve mechanism may be employed.

The fan assembly 100 comprises a user interface in the form of a digital display 102, operable by a user to cause the fan assembly 100 to operate in a selected mode of operation. The user interface 102 is operable by a user to cause the valve mechanism 160 to move between the first, second and third positions in order to tailor their user experience. In other examples, the user interface may comprise one or more of a knob, button, switch and touch screen. The user interface 102 is wirelessly connectable to a remote control or other remote device, such as a smart device (e.g. a mobile phone or tablet) running a suitable application, from which the user may provide an input corresponding to one or more operating parameters of the fan assembly 100. In other examples, the user interface may be voice activated.

The fan assembly 100 comprises a heater 170 to selectively heat airflow generated by the airflow generator 118. In this example, the heater 170 is located within the stand 110. It will be appreciated that other examples are envisaged in which one or more heaters are located within the nozzle, for example a heater may be associated with a respective first or second air outlet 130, 140. It will be appreciated that other examples are envisaged in which the fan assembly additionally or alternatively comprises a cooler, humidifier, dehumidifier and/or purifier to selectively treat airflow generated by the airflow generator.

The heater 170 is communicatively connected to a controller 180 positioned within the stand 110. The controller 180 is configured to cause the valve mechanism 160 to selectively permit or prevent airflow to pass through the first or second air outlet 130, 140 in dependence on a status of the heater. For example, the controller 180 may be configured to determine that the heater 170 is heating airflow and, in response, cause the valve mechanism 160 to move to the third position so that a heated, diffused airflow is delivered to a user.

The user interface is operable by a user to select an operating condition of the heater in order to tailor their user experience.

Figure 6:
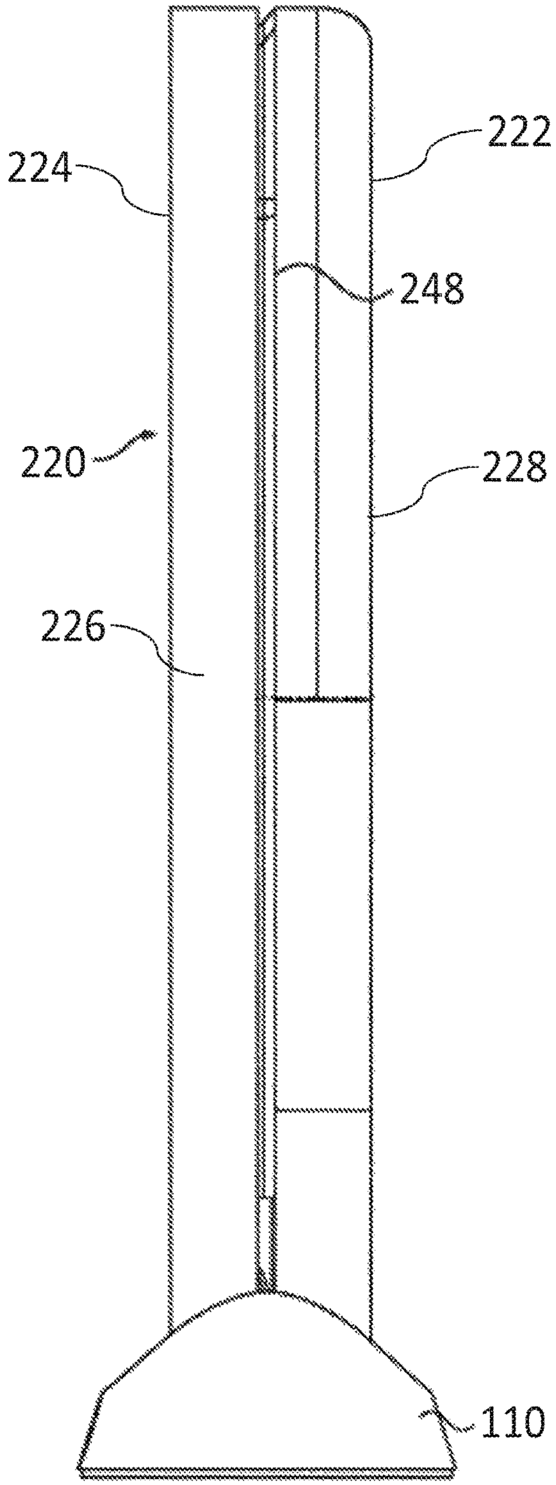
FIG. 6 is a side view of a nozzle of a fan assembly according to the present invention.

FIG. 6 shows a side view of an alternative nozzle 210 suitable for use with the stand 110 of the fan assembly 100. The nozzle 210 is substantially identical to the nozzle 110 shown in FIGS. 1-4 and like features are depicted with the same reference numerals, but increased by 100.

The nozzle 210 comprises a third air outlet 248. The third air outlet 248 is defined in the lateral sides 226 of the nozzle body 222 and extends at a single aperture from one lateral side 226, over a top end of the nozzle body 222 to the other lateral side 226. The third air outlet 248 is arranged to emit a third airflow delivered as a diffused airflow in a substantially sideward direction of the nozzle body 222.

In this example, the nozzle 210 is usable with a valve mechanism 260 that is movable between the first, second and third positions described above, in each of which airflow is not permitted to pass through the third air outlet 248, and a fourth position in which airflow generated by the airflow generator 118 is permitted to pass through the third air outlet 248 and prevented from passing through the first and second air outlets 230, 240.

Whilst particular examples and embodiments have been described, other embodiments are envisaged which fall within the scope of the invention. For example, the second air outlet may comprise a single aperture and/or the first air outlet may comprise a plurality of apertures. Whilst in the embodiments described above the first air outlet comprises a circular aperture and the second air outlet comprises a pair of rectangular apertures, alternative geometries and arrangements for each of the air outlets are possible, particularly geometries in which the aperture(s) of the first air outlet has a different aspect ratio to the aperture(s) of the second air outlet, or in which one or each outlet comprises a plurality of apertures.

The invention claimed is:

1. A fan assembly comprising:

an airflow generator arranged to generate an airflow;

a nozzle comprising a nozzle body and first and second air outlets defined in a front side of the nozzle body, the first and second air outlets arranged to emit the airflow from the fan assembly in a substantially forward direction of the nozzle body; and a valve mechanism to selectively permit the airflow to pass through the first air outlet or the second air outlet, wherein the first and second air outlets have different geometries such that the first air outlet emits a first airflow as a focused airflow, and the second air outlet emits a second airflow as a diffused airflow; and wherein the nozzle body comprises an elliptical portion and the second air outlet is defined in the elliptical portion and extends around at least a portion of the elliptical portion.

2. The fan assembly according to claim 1, wherein the first air outlet has an aspect ratio of substantially 1:1, and the second air outlet has an aspect ratio of at least 2:1.

3. The fan assembly according to claim 1, wherein a height of the second air outlet is at least two times greater than a height of the first air outlet, or a width of the first air outlet is at least two times greater than a width of the second air outlet.

4. The fan assembly according to claim 1, wherein the first air outlet is substantially circular, and the second air outlet is substantially rectangular.

5. The fan assembly according to claim 1, wherein a ratio of cross-sectional areas of the first and second air outlets is between 0.1 and 10.

6. The fan assembly according to claim 1, wherein the first outlet has an equivalent diameter between 20 mm and 200 mm.

7. The fan assembly according to claim 1, wherein the first air outlet is at least partially surrounded by the elliptical portion.

8. The fan assembly according to claim 1, wherein the second air outlet comprises two apertures and the first air outlet is located between the two apertures.

9. The fan assembly according to claim 1, wherein the valve mechanism is movable between a first position in which airflow generated by the airflow generator is permitted to pass through the first air outlet and is prevented from passing through the second air outlet, a second position in which airflow generated by the airflow generator is permitted to pass through the first air outlet and the second air outlet, and a third position in which airflow generated by the airflow generator is permitted to pass through the second air outlet and is prevented from passing through the first air outlet.

10. The fan assembly according to claim 1, comprising a heater to selectively heat airflow generated by the airflow generator, and a controller to cause the valve mechanism to selectively permit or prevent airflow to pass through the first or second air outlet in dependence on a status of the heater.

11. The fan assembly according to claim 1, comprising a user interface operable by a user to cause the valve mechanism to selectively permit or prevent airflow to pass through the first or second air outlet.

12. The fan assembly according to claim 1, wherein the first or second air outlet comprises one or more movable baffles for directing the airflow emitted from the respective air outlet.

13. The fan assembly according to claim 1, comprising a third air outlet defined in a different side of the nozzle body to the front side of the nozzle body and arranged to emit the airflow from the fan assembly in a substantially sideward or rearward direction of the nozzle body.

14. The fan assembly according to claim 13, wherein the valve mechanism is arranged to selectively permit airflow to pass through the third air outlet.

15. A nozzle for a fan assembly, the nozzle comprising a nozzle body having an inlet for receiving an airflow, first and second air outlets defined in a front side of the nozzle body and arranged to emit the airflow in a substantially forward direction of the nozzle body, and a valve mechanism to selectively permit the airflow to pass through the first air outlet or the second air outlet, wherein the first and second air outlets have different geometries such that the first air outlet emits a first airflow as a focused airflow and the second air outlet emits a second airflow as a diffused airflow, and wherein the nozzle body comprises an elliptical portion and the second air outlet is defined in the elliptical portion and extends around at least a portion of the elliptical portion.

16. A fan assembly comprising:

an airflow generator arranged to generate an airflow;

a nozzle comprising a nozzle body and first and second air outlets defined in a front side of the nozzle body, the first and second air outlets arranged to emit the airflow from the fan assembly in a substantially forward direction of the nozzle body, the nozzle further comprising a third air outlet defined in a different side of the nozzle body to the front side of the nozzle body and arranged to emit the airflow from the fan assembly in a substantially sideward or rearward direction of the nozzle body; and a valve mechanism to selectively permit the airflow to pass through the first air outlet or the second air outlet, wherein the first and second air outlets have different geometries such that the first air outlet emits a first airflow as a focused airflow, and the second air outlet emits a second airflow as a diffused airflow.

* * * * *